United States Patent [19]

Sekiya

[11] Patent Number: 4,631,553

[45] Date of Patent: Dec. 23, 1986

[54] PRINTER HEAD OF AN INK-JET PRINTER

[75] Inventor: Takuro Sekiya, Yokohama, Japan

[73] Assignee: Ricoh Company, Ltd., Japan

[21] Appl. No.: 720,489

[22] Filed: Apr. 8, 1985

Related U.S. Application Data

[63] Continuation-in-part of Ser. No. 399,004, Jul. 16, 1982, abandoned.

[30] Foreign Application Priority Data

| | | | |
|---|---|---|---|
| Jul. 17, 1981 | [JP] | Japan | 56-111668 |
| Aug. 20, 1981 | [JP] | Japan | 56-130786 |
| Aug. 20, 1981 | [JP] | Japan | 56-130787 |

[51] Int. Cl.[4] .......... G01D 15/16

[52] U.S. Cl. .......... 346/140 R; 346/75

[58] Field of Search .......... 346/140, 75

[56] References Cited

U.S. PATENT DOCUMENTS

| | | | |
|---|---|---|---|
| 3,661,304 | 5/1972 | Martinez | 346/75 X |
| 3,974,508 | 8/1976 | Blumenthal | 346/140 |
| 4,184,169 | 1/1980 | Taylor | 346/140 |
| 4,216,477 | 8/1980 | Matsuda | 346/140 |

OTHER PUBLICATIONS

Brady et al; Fluid Circuit for Fast Startup of an Ink Jet Head; IBM TDB, vol. 17, No. 5, Oct. 1974, p. 1524.

*Primary Examiner*—Joseph W. Hartary
*Attorney, Agent, or Firm*—Guy W. Shoup

[57] ABSTRACT

An improved printer head for use in a non-impact type printer such as an ink-jet printer is provided. The printer head includes a first flow passage extending from an inlet port, to which ink under pressure is supplied, to a draining port and a second flow passage branching out of the first flow passage and leading to a nozzle aperture directed against a recording medium on which a desired character is to be printed. In the vicinity of the draining port is provided a draining vibrator to which an image or character signal is supplied. Depending on the operating condition of the draining vibrator, the ink is either drained out of the draining port or ejected out of the nozzle aperture. In the preferred mode, a driving vibrator is provided in the vicinity of the inlet port, and the driving vibrator is operated to deflect periodically inwardly to cause the ink to be normally discharged out of the nozzle aperture. The draining vibrator is operated in response to an image signal to deflect outwardly in association with the inward deflection of the driving vibrator to prevent the ink from being ejected from the discharging nozzle.

18 Claims, 15 Drawing Figures

FIG.7 (a)
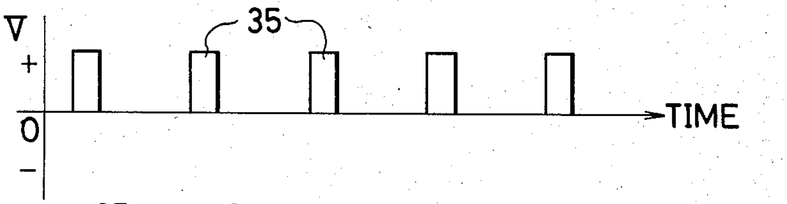
FIG.7 (b)
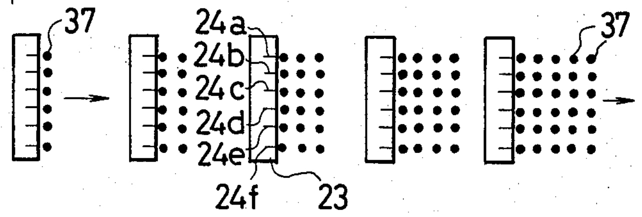
FIG.8 (a)
FIG.8 (b)
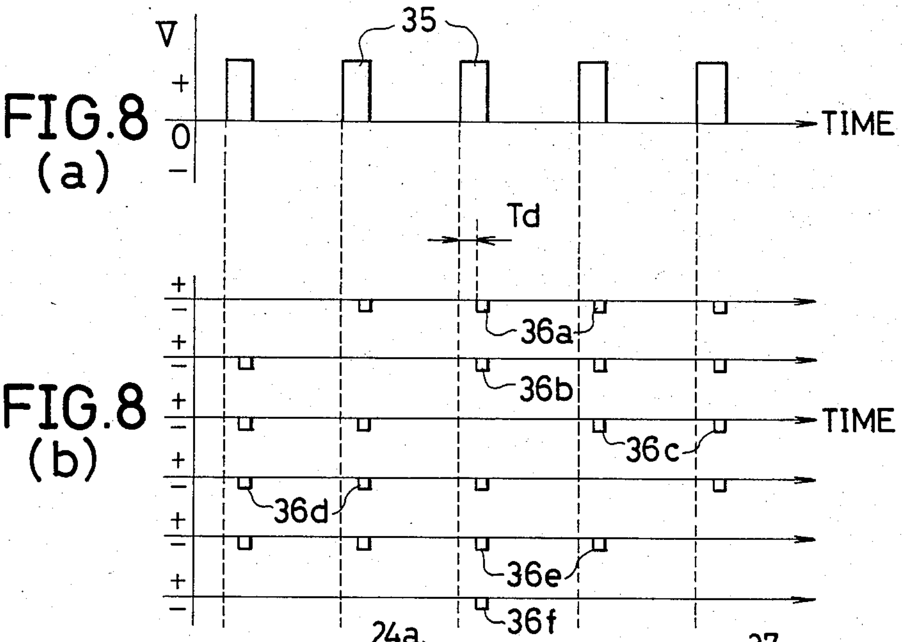
FIG.8 (c)
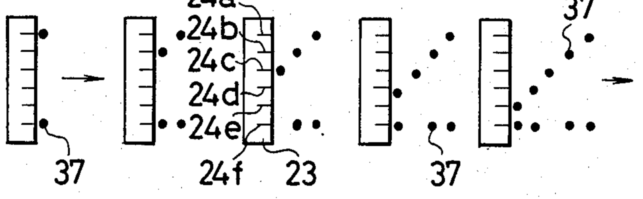

PRINTER HEAD OF AN INK-JET PRINTER

CROSS-REFERENCES TO RELATED APPLICATIONS

This is a continuation-in-part of application, Ser. No. 399,004, filed July 16, 1982 now abandoned.

BACKGROUND OF THE INVENTION

1. Field of the Invention

This invention generally relates to a non-impact type printer such as an ink-jet printer and in particular to a printer head for use in an ink-jet printing system.

2. Background of the Invention

In an ink-jet printing system, several printer heads have heretofore been used. For example, FIGS. 1(*a*) and (*b*) show the multi-nozzle on-demand type printer head in which a plurality of vibrators 1 to which an image signal is applied are provided for respective pumping chambers 2, which receive ink from an ink reservoir and supply the ink to the corresponding nozzles 3 through flow passages 4 in response to an image signal applied to the vibrators 1. In such a structure, ink droplets are ejected from those nozzles 3 whose corresponding vibrators 1 have received on-signals and ink droplets are not ejected from those nozzles 3 whose corresponding vibrators 1 have not received on-signals. However, since provision of the vibrators 1 and pumping chambers 2 requires a substantial space, the head tends to be bulky and there has been difficulty in arranging the nozzles 3 at high density. It is true that a high density nozzle array may be obtained by providing a structure as shown in FIG. 1*a;* however, it should be noted that the flow passages 4 are different in shape and length among those in the top or bottom half in the case of a symmetric arrangement, so that the overall fluid-dynamic resistance differs from one flow passage to another thereby hindering to obtain uniform ink droplets from all of the nozzles.

On the other hand, FIG. 2 shows the multi-nozzle deflection type printer head which comprises a vibrator 10, a vibrating plate 11, an ink chamber 12, a nozzle plate 13, charging electrodes 14, and deflection electrodes 15. In this case, ink is ejected out of the nozzles formed in the nozzle plate 13 to form ink droplets, which are then charged by the charging electrodes and deflected by the deflecting electrodes 15. In such a structure, however, since the charging and deflection electrodes 14 and 15 must be provided in front of the corresponding nozzles formed in the plate 13, it is complicated in structure and thus difficult to manufacture.

SUMMARY OF THE INVENTION

The disadvantages of the prior art as described above are overcome with the present invention and an improved printer head for use in a non-impact type printing system such as an ink-jet printer is provided.

It is therefore an object of the present invention to provide an improved printer head for use in an ink-jet printer.

Another object of the present invention is to provide an ink-jet printer head capable of discharging ink droplets to be deposited on a recording medium all uniform in size.

A further object of the present invention is to provide an ink-jet printer head which allows to form a high density multi-nozzle structure.

A still further object of the present invention is to provide an ink-jet printer head which is simple in structure and thus easy to manufacture.

A still further object of the present invention is to provide an ink-jet printer head suitable for high speed operation.

A still further object of the present invention is to provide a printer head for use in a non-impact type printer such as an ink-jet printer capable of forming a print character excellent in quality.

Other objects, advantages and novel features of the present invention will become apparent from the following detailed description of the invention when considered in conjunction with the accompanying drawings.

BRIEF DESCRIPTION OF THE DRAWINGS

FIG. 1(*b*) is a side-elevational view of the printer head shown in FIG. 1(*a*);

FIG. 3(*b*) is a perspective view showing the overall outside structure of the embodiment shown in FIG. 3(*a*);

FIGS. 7(*a*) and (*b*) and 8(*a*) through (*c*) are schematic illustrations which are useful for explaining the principle of mode of operation of the present invention.

DESCRIPTION OF THE PREFERRED EMBODIMENTS

Figure 1A:
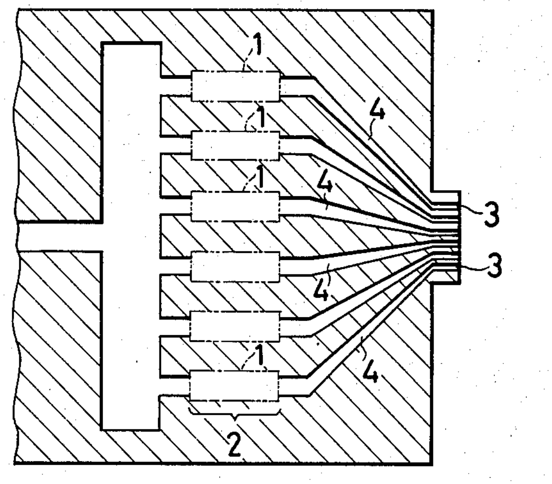
FIG.1(a) (PRIOR ART)
FIG. 1(*a*) is a cross-sectional view showing the structure of a typical prior art multi-nozzle on-demand type printer head for use in an ink-jet printing system.
Figure 1B:
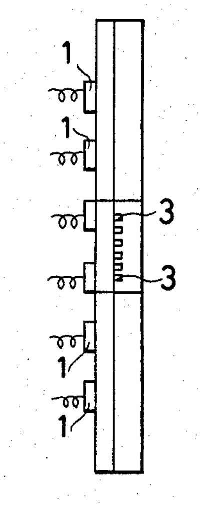
FIG.1(b) (PRIOR ART)
Figure 2:
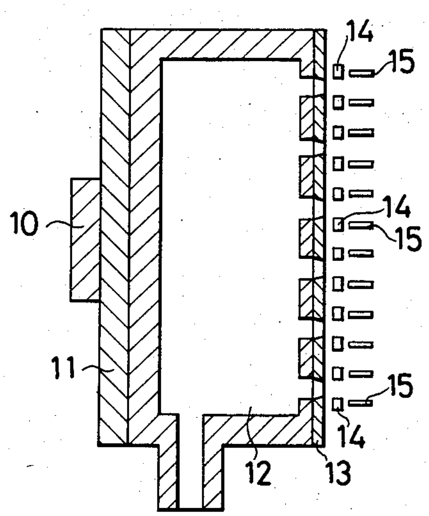
FIG.2 (PRIOR ART)
FIG. 2 is a cross-sectional view showing the structure of a typical prior art multi-nozzle deflection type printer head for use in an ink-jet printing system.
Figure 3A:
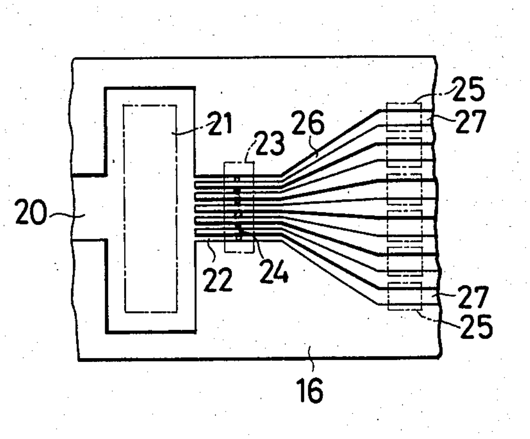
FIG. 3(*a*) is a schematic illustration showing one embodiment of the present printer head.
Figure 3B:
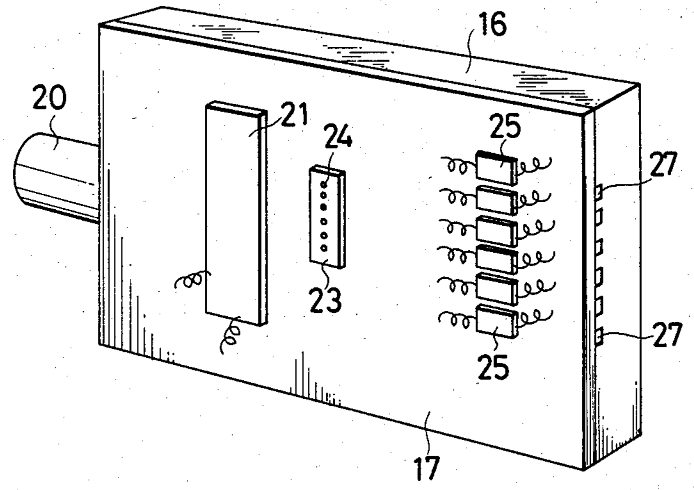

FIGS. 3(*a*) and (*b*) schematically show one embodiment of the present printer head for use in non-impact type printer such as an ink-jet printer and it generally comprises a base plate 16 having a top surface in which flow-passage-forming grooves are engraved and a cover plate 17 which is brought into intimate contact with the groove-formed surface of the base plate 16. As shown in FIG. 3(*a*), grooves or recesses are formed in the top surface of the base plate 16 to define various flow channels. The base plate 16 is preferably comprised of a rectangular body as shown.

As shown, an ink inlet port 20 is defined at the left end of the base plate 16. The inlet port 20 is connected to an ink reservoir where an ink supplying vibrator 21, preferably comprised of an electrostrictive or magnetostrictive vibrator, is located as mounted on the cover plate 17, so that the vibrator 21 imparts vibration to the ink inside the reservoir. A plurality of ink-supplying channels 22 all in the same size extend from the ink reservoir in parallel over a predetermined distance where the ink-supplying channels 22 are connected to respective ink-draining channels 26 which gradually increase in size toward right and terminate with ink-draining ports 27.

Approximately in the middle along the length of the ink-supplying channels 22 is disposed a nozzle plate 23, which is provided with nozzle apertures 24 corresponding in number and position with the ink-supplying channels 22, as mounted on the cover plate 17, as best shown in FIG. 3(*b*). Although not shown specifically, it is to be noted that through-holes are provided in the cover plate 17 corresponding in position and number with the nozzle apertures 24. In the vicinity of the ink-draining ports 27, there are disposed ink-draining vibrators 25, preferably comprised of an electrostrictive or magnetostrictive vibrator, one for each of the draining channels 26 as mounted on the cover plate 17. An image signal having information to be printed on a recording medium is supplied to the vibrator 25 which are operated in accordance with the respective contents of such an image signal.

Although it is not shown for the sake of simplicity, it should be understood that a recording medium such as paper is located opposite to the nozzle apertures 24 and the recording medium is moved relative to the printer head in printing a desired character. It is to be noted that the cover plate 17 may be tightly fixed to the top surface of the base plate 16 by any appropriate fixing means such as adhesives, whereby the channels form sealed flow passages extending between the inlet port 20 and the draining ports 27. It is also to be noted that the grooves of the base plate 16 may be easily formed by applying conventional photoetching technology.

In operation, ink under pressure is supplied from an ink source (not shown) to the ink reservoir of the present printer head through the inlet port 20. The ink inside the reservoir receives vibration by means of the vibrator 21 and, thus, in a recording mode, the ink flowing through the channels 22 will be discharged into the open air through the ink apertures 24 thereby forming into ink droplets to be deposited on a recording medium positioned opposite to the ink apertures 24. The frequency of vibration imparted by the vibrator 21 has an influence on the pitch of the ink droplets formed. In the embodiment shown in FIG. 3(*a*), ink droplets may be formed at six different levels in height because the six nozzle apertures 24 are arranged along a vertical line spaced apart from each other.

In this manner, if ink is to be ejected from a nozzle aperture 24, the corresponding ink-draining vibrator 25 is held inoperative. On the other hand, if ink should not be ejected from a nozzle aperture 24, the corresponding ink-draining vibrator 25 is operated in accordance with an image or character signal supplied thereto from an image or character pattern supplying source (not shown), so that the ink inside the corresponding flow passage is caused to be drained through the corresponding draining port 27. As a result, no ink is ejected from the corresponding nozzle aperture 24. In other words, the state of the ink-draining vibrator 25, i.e., in operation or not, determines whether ink is discharged out of the corresponding nozzle aperture 24 or drained out of the corresponding draining port 27. Accordingly, ink may be selectively discharged out of a plurality of nozzle apertures 24 thereby allowing to print a desired character on the recording medium.

It is to be noted that preferably the ink coming out of the draining ports 27 may be collected by any conventional means and the thus collected ink may be transported to the ink supply source for reuse with or without further processing.

Figure 4:
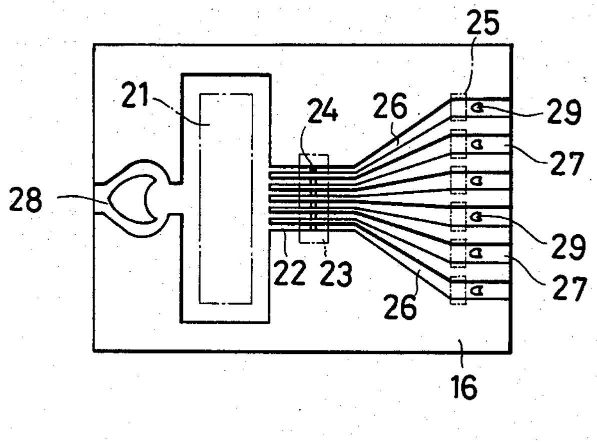
FIG. 4 is a schematic illustration showing another embodiment of the present printer head in which a fluid-dynamic diode is provided, FIGS. 5(*a*) and (*b*) are schematic illustrations showing on an enlarged scale the operation of the fluid-dynamic diode provided in the printer head of FIG. 4.

FIG. 4 shows another embodiment of the present invention in which a fluid-dynamic diode 28 is provided in the vicinity of the inlet port 28 and another fluid-dynamic diode 29 is provided in each draining channel 26 in the vicinity of its draining port 27. The fluid-dynamic diode is to be provided in a flow channel and it is so structured that it presents a first fluid-dynamic resistance when the fluid flows along the channel in a first direction and it presents a second fluid-dynamic resistance when the direction of the flow is reversed, whereby the first resistance differs from the second resistance. In other words, if the first flow direction is the forward or wanted direction and the reversed direction is the backward or unwanted direction, the fluid-dynamic diode may be so structured that the first resistance is smaller than the second resistance. That is, by providing such a fluid-dynamic diode in the flow channel formed by the groove engraved in the top surface of the base plate 16, the reversed ink flow may be substantially decreased thereby allowing to carry out an effective control over formation or non-formation of an ink droplet.

Figure 5A:
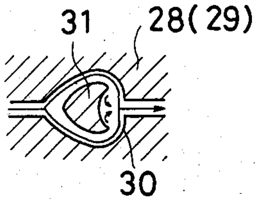
Figure 5B:
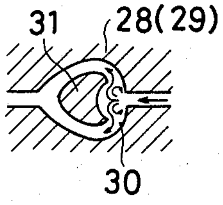

One example of the fluid-dynamic diode applicable to the present printer head is shown on an enlarged scale in FIGS. 5(*a*) and (*b*). As shown, a widened portion 30 is provided in the flow channel and a heart-shaped island 31 is provided in the widened portion 30. FIG. 5(*a*) shows the case where the flow is in the forward direction; whereas, FIG. 5(*b*) shows the case where the flow is in the backward direction. As may be easily understood, when the flow is in the forward direction as shown in FIG. 5(*a*), the flow mostly follows the streamline so that a relatively small fluid-dynamic resistance is encountered. On the other hand, when the flow is in the reversed direction as shown in FIG. 5(*b*), the flow is somewhat disturbed and eddies are formed to lose energy so that a relatively large fluid-dynamic resistance is encountered. As may have been already understood, such a fluid-dynamic diode is advantageous because it has no moving parts.

In the fluid-dynamic diode shown in FIGS. 5(*a*) and (*b*), a difference in resistance between the forward and reversed flow directions is not significantly large. However, it has been experimentally found that provision of this fluid-dynamic diode in the present printer head as shown in FIG. 4 can control the direction of an ink flow extremely well and provide other advantages. For example, it has been found that the response frequency may be enhanced approximately up to 10 kHz without any interaction among nozzle apertures and that the printer head operates satisfactorily even if the voltage level of a driving pulse to be applied to the vibrators is lowered as compared with the conventional level.

It should further be noted that the fluid-dynamic diode basically has a planar structure as shown, so that it may be formed at the same time of forming other grooves in the top surface of the base plate 16. Thus, no additional step is required and the manufacturing cost may be maintained at minimum.

Figure 6A:
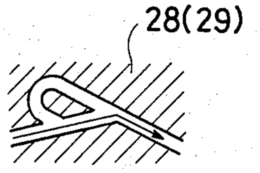
FIGS. 6(*a*) and (*b*) are schematic illustrations showing on an enlarged scale the operation of another fluid-dynamic diode which may be incorporated into the present printer head.
Figure 6B:
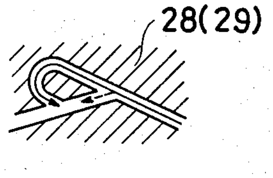

FIGS. 6(*a*) and (*b*) show another example of the fluid-dynamic diode applicable to the present invention. As shown, this fluid-dynamic diode has basically the same structure as that of the above-described first example. However, a bent flow passage is required in this second example. FIG. 6(*a*) shows when the flow is in the forward direction and FIG. 6(*b*) shows when the flow is in the reversed direction. As described previously, it is structured such that more pressure loss will be produced when the direction of the flow is reversed. It is also to be noted that a series of fluid-dynamic diodes or a combination of different fluid-dynamic diodes may be provided, if necessary.

Now, the principle of one mode of operation of the present printer head shown in FIGS. 3(*a*) and (*b*) will be described in detail with particular reference to FIGS. 7(*a*) and (*b*) and FIGS. 8(*a*) through (*c*). FIGS. 7(*a*) and (*b*) show the case in which the vibrator 21 is operated periodically at a predetermined time interval by driving pulses 35 while keeping the draining vibrators 25 inoperative. The driving pulses 35 applied to the vibrator 21 are positive in polarity. As shown, when the positive driving pulse 35 is applied, the vibrator 21 deflects inwardly of the ink chamber so that the volume of ink chamber is reduced thereby increasing the pressure inside of the ink chamber. As a result, the ink inside of the ink chamber is pushed out of the six nozzle apertures 24 provided in the nozzle plate 23. In this case, the ink is pushed out of the six nozzle apertures 24*a* through 24*f* equally, and, thus, there are formed six ink droplets 37 which are substantially equal in size. The six ink droplets 37 thus formed at the same time fly toward the recording medium (not shown) placed opposite to the nozzle plate 23 as indicated by the arrow. It will be understood easily that those six ink droplets 37 are formed simultaneously each time when the positive driving pulse 35 is applied to the vibrator 21 while keeping the vibrators 25 inoperative.

Now, with particular reference to FIGS. 8(*a*) through (*c*), it will be described as to the case in which the positive driving pulse 35 is applied to the vibrator 21 periodically at a predetermined time interval and negative driving pulses 36 are selectively applied to the vibrators 25 in accordance with a desired character pattern to be printed. FIG. 8(*a*) shows the positive driving pulses 35 which are applied to the vibrator 21 and corresponds to FIG. 7(*a*). Thus, if no driving pulses are applied to the draining vibrators 25 while applying the driving pulse 35 periodically to the vibrator 21, there are produced six ink droplets 37 simultaneously as ejected from the respective six nozzle apertures 24*a* through 24*f* as described above. On the other hand, when driving pulses 36, which are negative in polarity, are selectively applied to the draining vibrators 25, those vibrators 25 which have received the negative driving pulses 36 deflect outwardly thereby causing the corresponding portions of the ink flow passage to be enlarged. In this case, the ink is forced to flow toward the draining vibrator 25 instead of being discharged out of the nozzle aperture 24.

Described more in detail, in the illustrated example, when the positive driving pulse 25 is applied to the vibrator 21 for the first time, the negative driving pulses 36*b*, 36*c*, 36*d* and 36*e* are applied to the corresponding draining vibrators 25 thereby inhibiting the ink droplets to be formed from the corresponding nozzle apertures 24*b*–24*e*. In this case, however, since no negative driving pulses 36*a* and 36*f* are applied to the corresponding draining vibrators 25, there are produced two ink droplets 37 as ejected from the top and bottom nozzle apertures 24*a* and 24*f*. Similarly, when the positive driving pulse 35 is applied to the vibrator 21 for the second time, the negative driving pulses 36*a*, 36*c*, 36*d* and 36*e* are applied to the corresponding draining vibrators 25 so that ink droplets 37 are ejected only from the nozzle apertures 24*b* and 24*f* in this case.

In this manner, in accordance with this mode of operation, driving pulses of one polarity (positive polarity in the above example) are periodically applied to the vibrator 21 and driving pulses of opposite polarity are selectively applied to the corresponding draining vibrators 25 in association with the application of the driving pulses to the vibrator 21, so that ink droplets are formed as ejected from those nozzle apertures 24 whose corresponding draining vibrators 25 have not received the driving pulses of opposite polarity. In other words, the ink is discharged out of the corresponding draining ports 27 if no driving pulses of opposite polarity are applied to the draining vibrators 25.

As clearly indicated in FIGS. 8(*a*) and (*b*), the negative driving pulse 36 is applied with a time delay of Td after the application of the corresponding positive driving pulse 35. Such a time delay Td is preferably provided in consideration of the propagation delay of a pressure wave which travels through the channel 26. Such a time delay Td may be easily determined depending on the conditions of application.

As is obvious for one skilled in the art, the application of negative driving pulses to the draining vibrators 25 may be considered to effectively lower the flow resistance against the flow of ink toward the draining ports 27 as compared with the flow resistance against the flow of ink toward the nozzle apertures 24. Thus, use may be made of any other means to effectively change the flow resistance against the flow of ink toward the discharging port 27 as compared with the flow resistance presented by the ink passage leading toward the nozzle aperture 24 to control the flow of ink thereby controlling the formation of ink droplets as ejected from the nozzle apertures 24.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A printer head for use in a non-impact printer such as an ink-jet printer comprising:

a first flow passage extending from an ink inlet port to an ink draining port;

a second flow passage branching out from said first flow passage and connected to an ink discharging nozzle through which ink is discharged to form ink droplets to be deposited on a recording medium, said second flow passage having a first flow resistance against a flow of ink flowing therethrough which is substantially smaller than a second flow resistance presented by that portion of said first flow passage from the branch-out point between said first and second flow passages to said ink draining port;

means for periodically imparting motion to the ink residing between said ink inlet port and the branch-out point between said first and second flow passages thereby normally causing the ink to be discharged out of said ink discharging nozzle for use in printing; and flow control means for controlling the flow of ink through said ink draining port in response to an image signal supplied thereto whereby when said flow control means is operated to drain ink through said ink draining port, ink is prevented from being discharged out of said ink discharging nozzle through a difference between said first and second flow resistances.

2. The printer head of claim 1 wherein a plurality of said first flow passages are provided and the like plurality of said second flow passages are provided corresponding thereto whereby an array of said ink discharging nozzles is formed.

3. The printer head of claim 1 further comprising an ink reservoir provided between said ink inlet port and the branch-out point between said first and second flow passages; and wherein said motion imparting means includes a first vibrator disposed adjacent to said reservoir for imparting vibration to the ink inside said reservoir.

4. The printer head of claim 3 wherein said first vibrator includes a magnetostrictive or electrostrictive vibrator.

5. The printer head of claim 1 wherein said flow control means includes a second vibrator disposed adjacent to said each ink draining port for imparting vibration to the ink in said first flow passage in the neighborhood of said ink draining port thereby controlling the flow of ink through said ink discharging port.

6. The printer head of claim 5 wherein said second vibrator includes a magnetostrictive or electrostrictive vibrator.

7. The printer head of claim 1 wherein said flow control means includes a fluid-dynamic diode provided in said first flow passage in the vicinity of said ink draining port, said fluid-dynamic diode presenting a first fluid-dynamic resistance when said flow of ink is in the draining direction and a second fluid-dynamic resistance when said flow of ink is reversed whereby said second resistance is larger than said first resistance.

8. The printer head of claim 1 wherein said first flow passage includes a fluid-dynamic diode disposed in the vicinity of said ink inlet port, said fluid-dynamic diode presenting a third fluid-dynamic resistance when said flow of ink is in the direction incoming to said inlet port and a fourth fluid-dynamic resistance when said flow of ink is reversed whereby said fourth resistance is greater than said third resistance.

9. A printer head for use in a non-impact type printer such as an ink-jet printer comprising:

a base plate having a first surface in which is formed a groove extending from an inlet port through which ink under pressure is supplied and a draining port through which the ink in said groove is drained under control;

a cover plate disposed in contact with the first surface of said base plate thereby sealing said groove except said inlet and draining ports, said cover plate being provided with a through-hole which is positioned to be in fluid communication with said groove thereby allowing to discharge ink through said through-hole for use in printing when the ink is not drained through said draining port, said through-hole having a first flow resistance against the flow of ink therethrough, which is substantially smaller than a second flow resistance against the flow of ink presented by that portion of said groove from the point where said through-hole is connected to said draining port;

means for periodically imparting motion to the ink residing in said groove between said inlet port and said through-hole thereby normally causing the ink to be discharged out of said through-hole and flow control means disposed in the vicinity of said draining port for controlling the flow of ink through said draining port in response to an image signal supplied thereto utilizing a difference between said first and second flow resistances.

10. The printer head of claim 9 further comprising a nozzle plate provided with a nozzle hole, which is attached to said cover plate such that said nozzle hole is in registry with the through-hole of said cover plate.

11. The printer head of claim 9 wherein said base plate is a rectangular body whereby said inlet port is defined at one end and said draining port is defined at the opposite end.

12. A printer head for use in a non-impact type printer such as an ink-jet printer comprising:

a first flow passage extending from an inlet port to an ink draining port;

a second flow passage branching out from said first, flow passage and connected to an ink discharging nozzle through which ink is discharged to form ink droplets to be deposited on a recording medium;

first flow control means disposed between said ink inlet port and the branch-out point between said first and second flow passages for periodically deflecting inwardly with respect to said first flow passage to cause the ink to be normally discharged out of said ink discharging nozzle; and second flow control means disposed at said ink draining port for deflecting outwardly with respect to said first flow passage in association with the inward deflection of said first flow control means in response to an image signal supplied to cause ink to be drained out of said ink draining nozzle thereby preventing said ink to be discharged out of said ink discharging nozzle.

13. The printer head of claim 12 wherein a plurality of said first flow passages are provided and the like plurality of said second flow passages are provided corresponding thereto whereby an array of said ink discharging nozzles is formed.

14. The printer head of claim 12 further comprising an ink reservoir provided between said ink inlet port and the branch-out point between said first and second flow passages; and wherein said first flow control means includes a first vibrator disposed adjacent to said reservoir, which may deflect inwardly to reduce the volume of said reservoir temporarily thereby imparting pressure to the ink inside of said reservoir.

15. The printer head of claim 14 wherein said first vibrator is a magentostrictive or electrostrictive vibrator.

16. The printer head of claim 14 wherein said second flow control means includes a second vibrator disposed adjacent to said each ink draining port, which may deflect outwardly to locally increase the volume of said first flow passage in the neighborhood of said ink draining port thereby causing the ink inside of said first flow passage to be pulled toward said ink draining port to prevent the ink from being ejected from said ink discharging nozzle.

17. The printer head of claim 16 wherein said second vibrator includes a magnetostrictive or electrostrictive vibrator.

18. The printer head of claim 12 wherein said second flow control means is operated with a predetermined time delay with respect to said first flow control means.

* * * * *